(12) United States Patent
Kessel

(10) Patent No.: US 6,383,067 B1
(45) Date of Patent: May 7, 2002

(54) DEVICE FOR DEBONING OF POULTRY PARTS

(75) Inventor: Ad Kessel, 's Gravezande (NL)

(73) Assignee: FPM International, Hoevenen (BE)

( * ) Notice: Subject to any disclaimer, the term of this patent is extended or adjusted under 35 U.S.C. 154(b) by 0 days.

(21) Appl. No.: 09/434,471

(22) Filed: Nov. 5, 1999

(51) Int. Cl.$^7$ ............................................. A22C 17/04

(52) U.S. Cl. ...................................................... 452/138

(58) Field of Search ................................. 452/138, 127

(56) References Cited

U.S. PATENT DOCUMENTS

| | | | |
|---|---|---|---|
| 5,064,403 A | * 11/1991 | Elsten | 452/138 |
| 5,267,891 A | * 12/1993 | Cresson et al. | 452/138 |
| 5,445,562 A | * 8/1995 | Brunnell et al. | 452/138 |
| 5,782,685 A | * 7/1998 | Hazenbroek et al. | 452/138 |
| 5,976,004 A | * 11/1999 | Hazenbroek et al. | 452/138 |

* cited by examiner

Primary Examiner—Peter M. Poon
Assistant Examiner—Kevin Jakel
(74) Attorney, Agent, or Firm—Jacobson Holman, PLLC

(57) ABSTRACT

A deboning device for separating bone (8) and meat (9) of an animal part (7) has a support system (5) for supporting at least one deboning unit (1) and moving the at least one deboning unit (1) from a loading position (3) for loading the animal part (7) to a deboning position (4) for deboning the animal part (7), the deboning unit (1) being provided to receive the animal part (7) in the longitudinal direction thereof, the deboning unit (1) involving a meat stripper device (2) with a meat stripper disc (21) made of a flexible material, the meat stripper disc (21) involving an aperture (22) for receiving the bone (8) in the longitudinal direction there through, the deboning unit (1) also involving a bone pusher assembly (10), the bone pusher assembly (10) being aligned with the meat stripper disc (21) and being slidably movable in the longitudinal direction of the animal part (7) so as to co-operate with the meat stripper disc (21) to displace the bone (8) in the longitudinal direction of the meat (9), at least part of the bone pusher assembly (10) being displaceable throughout the aperture (22) in the meat stripper disc (21), characterized in that the deboning device also has (a) a clamping apparatus to allow for a clamping of the animal part (7) within the deboning unit (1) in the longitudinal direction of the bone (8), the clamping apparatus involving the meat stripper device (2), the meat stripper device being provided to support a lower part of the animal part in cross direction of the bone, and a head part (13, 14) of the bone pusher assembly (10) facing the meat stripper disc (21), so as to clamp the animal part between the head part (13, 14) and the meat stripper device (2), (b) space around the animal part being open to allow the meat to be compressed in the course of the deboning operation, and (c) apparatus for retaining the bone after it has been displaced through the aperture of the meat stripper disc.

18 Claims, 2 Drawing Sheets

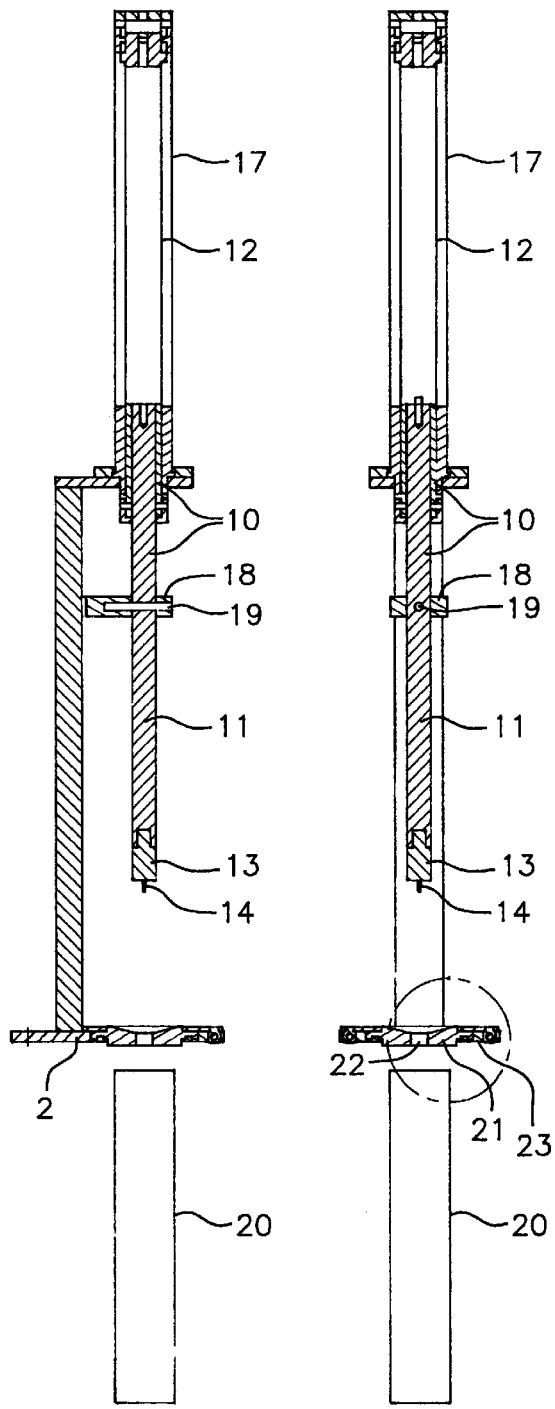
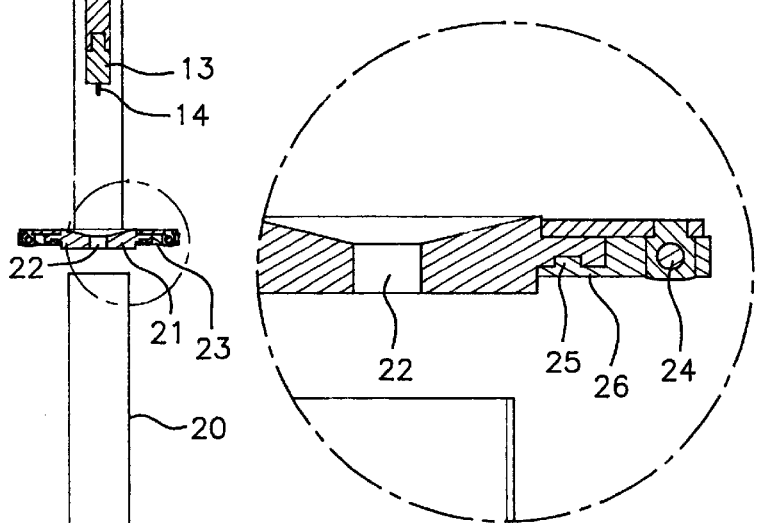

DEVICE FOR DEBONING OF POULTRY PARTS the present invention relates to a device and a method for the deboning of animal parts, in particular fowl parts.

The usual procedure for deboning animal parts is to strip the meat from the bone by forcing the bone in longitudinal direction through a small aperture in a meat stripper disc. The longitudinal movement of the bone through the aperture allows the meat to be scraped from the bone, along the length of the bone. Usually, the meat remains in a single mass after it has been stripped from the bone. An advantage of removing the bone from an edible poultry part is that the cooking time can be reduced. Also, the bone can be separately recovered and further processed for example as bone meal.

From the art, a plurality of methods and devices for removing the bones from the poultry parts are known.

From U.S. Pat. No. 4,893,378 a device is known wherein a plurality of deboning modules are mounted on a revolving support system. As the device revolves, poultry thighs are placed in sequence in the deboning modules and meat stripping is performed sequentially on each thigh. Each of the deboning modules includes a rotary bone holder for rotating the bone about its own longitudinal axis. Each of the deboning modules also includes a pair of notched stripping blades, which engage the bone and move along the length of the bone as the bone is rotated, to strip the meat from the bone. To enhance the meat removal, in the course of the stripping action a twisting action is imparted to the bone with respect to the meat.

The device disclosed in U.S. Pat. No. 4,893,378 however presents the disadvantage that, in order to allow the meat to be deboned, the meat needs to be cut from the bone before the deboning operation can be started. As the contours of the bone are mostly irregular and inflexible, the meat yield will be low. Also in order to allow the stripping blades to pass the knuckle in the course of the deboning operation, they will have to be opened and closed, which will further decrease the meat yield.

In U.S. Pat. No. 5,173,076 a device is disclosed which comprises a pair of spaced apart chain conveyors for carrying a plurality of deboning units mounted on the conveyors, along a substantially endless processing path. Each deboning unit comprises a carrier tray assembly for receiving the poultry parts that need be deboned, a bone pusher assembly mounted at one end of the carrier tray and a meat stripper disc assembly mounted at the opposite end of the carrier tray. The meat stripper disc assembly comprises a flexible meat stripper disc supported within a rigid collar. Approximately in the center of the meat stripper disc an aperture is provided for receiving the poultry bones there trough. Each bone pusher assembly comprises a hollow pusher sleeve with an open front end. The pusher sleeve is moveable in the direction of the meat stripper disc assembly. Within the pusher sleeve, a pusher rod is slideably mounted, which is moveable towards and throughout the aperture in the meat stripper disc.

In the course of a deboning operation, a poultry part is loaded into each carrier tray and moved towards the deboning position. As the carrier tray approaches the deboning position, the front end of the pusher sleeve engages the poultry part. As the open front end of the pusher sleeve contacts the meat stripper disc, the pusher rod is urged towards the meat stripper disc to engage the thigh bone and urge the thigh bone through the aperture of the meat stripper disc. To ensure that the bone is completely removed from the meat, the pusher rod is displaced to a position where it extends through the aperture of the meat stripper disc.

A problem that is often encountered with the type of system disclosed in U.S. Pat. No. 5,173,076 is that in the course the deboning process the bone is broken. As a consequence the broken parts need to be manually removed from the meat and the meat may contain bone fragments, which is unwanted. Also, the manual removal of bones from the poultry part is time consuming. There is thus a need to a machine that does not present the risk to damaging the bone in the course of the deboning operation.

It is the aim of the present invention to provide a deboning device with which the problem of bone breaking and bone fragmentation in the course of the deboning action can be overcome.

This is achieved by means of the technical features of the characterizing part of the first claim.

The device of the present invention is characterized by the presence of a) clamping means for clamping at least part of the animal part within the deboning unit in longitudinal direction of the bone at a position between the bone pusher assembly and the meat stripper device, b) means for supporting the meat in cross direction of the bone in the course of the deboning action, whereby around the meat sufficient free space is left to allow the meat to be compressed c) means for retaining the bone after it has been displaced through the aperture of the meat stripper disc.

An analysis of the problem encountered with the device known from the state of the art has revealed that in the course of the deboning action, the bone pusher assembly first engages the top of the bone after which at least part of the bone pusher assembly is displaced within the animal part through the hole created in the animal part by the leaving bone, towards the meat stripper disc. In that way the bone is forced to leave the animal part in longitudinal direction thereof, towards and through the aperture in the meat stripper disc.

An analysis of the problem encountered with the device known from the state of the art has also revealed that as the bone pusher assembly is advanced through the interior of the animal part during the deboning process, the meat is compressed in longitudinal direction of the bone. In case of rather large animal parts with a large volume of meat, substantive power is required to force the bone to leave the meat and to displace the bone through the meat stripper disc. In the known device where the meat is carried in a carrier tray, often insufficient space is left to allow the meat to expand sufficiently in cross direction of the part. As a consequence, breach of the bone is a problem that is often encountered with. By providing in the device of this invention space to allow the meat to expand in cross direction of the animal part, bone cracking can be avoided. By providing in the device of this invention space to allow the meat to expand also the risk that the animal part is projected out of the deboning unit, because the resistance exerted by the aperture of the meat stripper disc is too large, can be minimized. The clamping force exerted to the bone allows ensuring a proper positioning of the animal part with respect to the meat stripper disc.

The means for retaining the bone after it has been displaced through the aperture of the meat stripper disc allow preventing a turning over of the bone in the advancing direction of the device at a too early stage, after the bone has been displaced out of the meat. A turning over of the bone at a too early stage could involve a blocking of the device and the need to manually remove the animal part from the device and to complete the deboning in a manual manner.

In a first preferred embodiment of this invention, at least part of the bone pusher assembly is displaceable through the aperture in the meat stripper device, to a position where it extends from the aperture of the meat stripper disc over a distance of approximately 1–1000 mm beyond the meat stripper disc. The distance over which the bone pusher assembly extends beyond the meat stripper disc is preferably equal to or larger than the length of the tendons. In that way a complete separation of meat and bone can be ensured even in case of parts wherein a strong bonding of the tendons to the bone is present. Such strong bonding can for example be found in larger animal parts for example turkey drums.

Preferably, in the deboning unit of the device of this invention means are provided for adjusting the positioning of the clamping means to the length of the animal part, so as to allow the device to be used for the deboning of animal parts of varying sizes. Thereto, the bone pusher assembly preferably comprises a pusher rod, which is slideably moveable within the deboning unit towards a retracted position so as to allow the animal part to be inserted, and from the retracted position towards an extended position in the course of the deboning operation. The clamping force is then exerted by the weight of the bone pusher assembly. The meat stripper disc preferably supports the animal part.

The pusher rod preferably comprises at a side facing the meat stripper device a head part that is shaped to engage a first end of the bone. In that way an appropriate clamping force can be exerted to the bone and it is ensured that the deboning operation proceeds as complete as possible. Thereby the shape of the head part is adapted, for example complementary to the shape of the bone to be received by it. The head part may comprise one or more longitudinally extending pins for engaging the cartilage and/or upper part of the bone. Preferably also, the surface of the head part is roughened and is provided with a coating of an elastic material so as to prevent damaging of the bone and to minimize the amount of bone fragments splitting from the bone in the course of the deboning operation.

The head part may either by fixed to the pusher rod, or be removably mounted. In the latter case the head part used may be adapted to the nature of the animal parts that need deboning.

In order to allow an improved deboning of large animal parts, it is important that the aperture in the meat stripper disc remains aligned with the bone pusher assembly, and that the meat stripper disc remains in the position as it was mounted within the meat stripper device. Also the meat stripper disc should be capable of withstanding large traction forces when the bone is forced through the aperture in the meat stripper disc. To solve this problem, the meat stripper device comprises at a side pointing away from the bone pusher assembly, a frame for receiving and supporting the meat stripper disc along at least part of its circumference. Preferably, at a side facing the bone pusher assembly, clamping means are provided for removably clamping the meat stripper disc within the frame.

Preferably the meat stripper disc comprises a circumferential rim which surrounds an internal part comprising the aperture. The thickness of the circumferential rim is less than the material thickness of the internal part of the meat stripper disc. Preferably also the material thickness of the internal part of the meat stripper disc decreases towards the aperture. This can for example be achieved by means of a meat stripper disc of which the side facing the part to be deboned is concave. The concave shape provides an improved guiding of the bone towards the aperture, as a consequence of which bone breaching can be minimized and the yield of the amount of meat retained after the deboning operation can be increased.

An improved bending of the meat stripper disc is especially of importance in case the diameter of the aperture in the meat stripper disc is chosen to be smaller than the smallest diameter of the bone. A small diameter of the aperture is mostly chosen so as to improve the deboning operation and to allow as much meat to be recovered as possible. In that case however substantive forces are needed to force the bone to move through the aperture in the meat stripper disc.

The bone pusher assembly of the device of this invention, preferably also comprises a central tube in which the pusher rod is fixed, the central tube being slideably moveable within a cylinder simultaneously with the pusher rod. Preferably also means are provided to avoid that the pusher rod can rotate with respect to the bone and the bone is broken or projected out of the deboning unit.

Furthermore, at a position beyond the meat stripper disc and aligned with the aperture of the meat stripper disc, in the deboning unit means are provided for receiving and retaining the bone in longitudinal direction, after it has been displaced through the aperture meat stripper disc.

The invention is further elucidated in the attached figures and the following description of the figures.

In FIG. 3, a cross section of a deboning unit is shown, along a side of the deboning unit.

In FIG. 4 a cross section of a deboning unit is shown along the front of the deboning unit.

FIG. 5 shows a cross section of a part of the meat stripper disc assembly.

Figure 1:
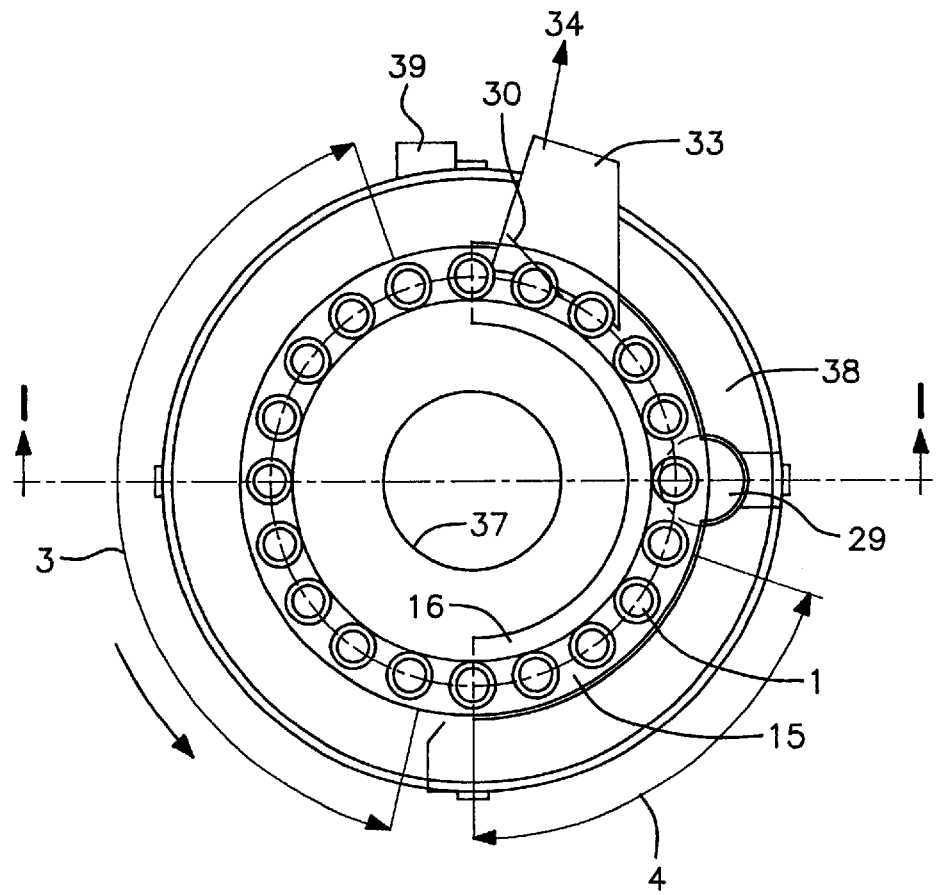
FIG. 1 is a view to the top of the device of this invention.
Figure 2:
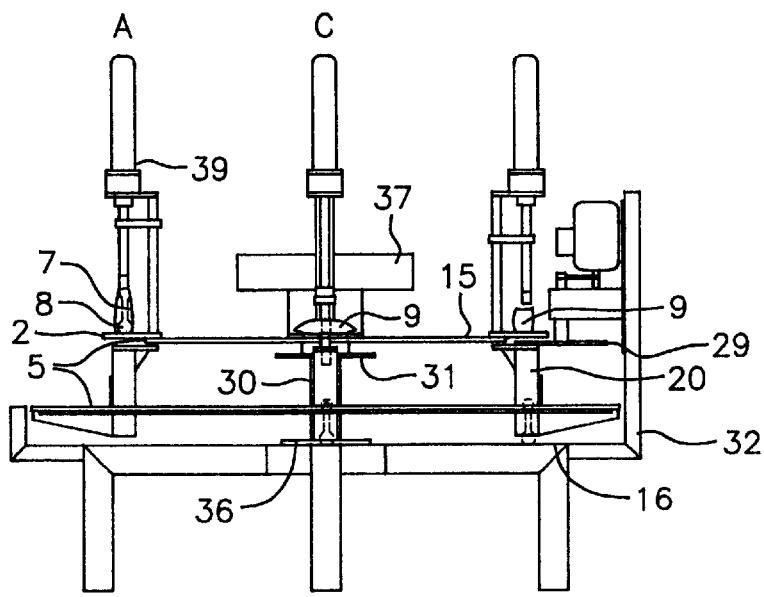
FIG. 2 is a cross section through the line I—I of FIG. 1.

The preferred embodiment of the device of the present invention shown in FIGS. 1 and 2, comprises a revolving housing 5 in which a plurality of deboning units 1 are mounted. The housing 5 is of a welded construction. The housing 5 is supported by a plurality of ground supported legs 6 and comprises a removably mounted, upright circumferential wall 32, which surrounds and supports the machine framework. The machine framework comprises a work table 15 mounted at a convenient height for the operator. The platform 16 defines a central aperture 36 wherein the driving system 31 of the device is mounted. The work table 15 shown in FIG. 1 is substantially circular, but may have other shapes too. A platform 16 is provided for receiving the bones and allowing the bones to be transported to a waste container. The work table 15 is connected to a product platform 38 by means of a plurality of bone receivers 20. In the circumferential wall 32, an opening 33 is provided through which the meat 9 is allowed to leave the device after it has been deboned, said opening 33 giving access to a meat collector 34.

The housing 5 contains at least one loading position 3 for loading the animal parts into the deboning units 1 and at least one deboning position 4 for deboning the animal parts. Deboning is performed while the housing revolves around the central axis. Depending on the nature of the animal parts that need to be deboned, the deboning operation may extend over a smaller or larger part of the revolving movement. The device may however comprise one or more loading and/or deboning positions. When revolving the work table 15 around a central axis 30, the deboning units are moved from the loading position 3 towards the deboning position 4 and returned to the loading position 3. In general the work table 15 and product platform 38 will be rotated simultaneously around the common central axis 30.

The number of deboning units provided in the device of this invention may vary widely. The device shown in FIG. 1 comprises 20 deboning units.

As is shown in FIG. 2, a plurality of meat stripper devices 2 are mounted on the work table 15. As can be seen from FIGS. 3 and 4, each meat stripper device 2 preferably has a substantially circular shape and comprises a substantially circular collar or frame 23 wherein a meat stripper disc 21 is mounted. The meat stripper disc 21 comprises a central aperture 22, through which the bone 8 of the animal part 7 is displaced in the course of the deboning operation. The diameter of the central aperture 22 is preferably smaller than the smallest diameter of the bone 8 to allow as much meat to be recovered from the animal part as possible. The meat stripper disc 21 is preferably made of a flexible resilient material, for example rubber. The collar 23 and meat stripper disc 21 may further comprise co-operating projections 25 and recesses 26 to allow an improved positioning of the meat stripper disc 21, and to prevent that the meat stripper disc 21 is displaced within the collar 23 in the course of the deboning operation. This can however also be achieved with other means known to the man skilled in the art, for example by providing holes in the outer edge of the meat stripper disc and pins in the frame, provided to extend through these holes. To improve the positioning of the meat stripper disc 21 and allow a removable mounting of the meat stripper disc 21 within the collar 23, damping means 24 may be provided on a side facing the bone pusher assembly 10.

As can be seen from FIGS. 3, 4 and 5, the thickness of the meat stripper disc 21 may vary. The outer edge of the meat stripper disc, which is received in the supporting frame 23, preferably has a smaller thickness than the remaining part of the meat stripper disc 21. This varying thickness involves an improved flexibility of the meat stripper disc. Because of the varying thickness, the outer edge of the disc 21 is bent towards the bone in the course of the deboning operation, the inner part of the disc remaining substantially nondeformed. In that way an improved scraping of the edge of the meat stripper disc 21 over the bone 8 can be achieved. The flexibility of the meat stripper disc 21 is of special importance in case the pusher rod 11 is displaced to a position beyond the meat stripper disc 21, as the disc 21 is then allowed to bent within the frame 23.

As can be seen from FIGS. 3 and 4, a meat stripper disc device 2 and corresponding bone pusher assembly 10 are mounted in line within the deboning unit. In line with the aperture 22 of the meat stripper disc 21, on a side of the meat stripper disc 21 facing away from the bone pusher assembly 10, means 20 are provided for receiving and retaining the bone 8 after it has been removed from the meat 9. In that way not only a proper deboning of the animal parts 7 can be ensured, but also it is possible to avoid that the bone 8 after it has been pushed through the meat stripper disc 21 in any manner adversely affects the functioning of the device. The bone receiver 20 may for example be a more or less cylindrical or rectangular tube mounted on the platform 16, or any other container known to the man skilled in the art.

On the work table 15, a plurality of bone pusher assemblies 10 are mounted. In the preferred embodiment of FIGS. 3 and 4 each bone pusher assembly 10 comprises a central tube 12 wherein a pusher rod 11 is mounted. The central tube 12 is slideably mounted in a piston rod 17, which can be operated as generally known to the man skilled in the art. The piston rod 17 can for example be a pneumatic or hydraulic operated cylinder.

The pusher rod 11 is extendible from the bone pusher assembly 10 between a retracted position shown in FIG. 2 (A) and (B) for receiving the animal part to be deboned and an extended position, shown in FIG. 2 (C). In the device of this invention it is possible to displace the pusher rod 11 throughout the meat stripper disc 21, to a position where the head 13 of the pusher rod 11 is displaced beyond the aperture 22 of the meat stripper disc 21, to allow a complete deboning of the animal part 7. It is however also possible to provide a pusher rod 11 which has a diameter larger than the diameter of the aperture 22 of the meat stripper disc 21. In that case, to separate bone and meat, the head 13 of the pusher rod 11 will only have to be displaced to a position where it touches the meat stripper disc 21, or else is situated within the aperture 22, and the meat stripper disc 21 is resiliently deformed in the advancing direction of the pusher rod 13. In that case, the device preferably comprises a first obstruction for rotating the bone out of the aperture 22 and a second obstruction or cutting means. These are provided to ensure that that in case any ligands or tendons remain, the meat and bone are torn apart.

A clamping force is exerted by the bone pusher assembly 10 to the animal part. This can be achieved in various ways generally known to the man skilled in the art. According to a first possible example, the meat is clamped between the pusher rod 11 and the meat stripper disc 21, by the weight of the bone pusher assembly 10. The clamping force can be increased by providing a spring or by exerting a pneumatic or hydraulic pressure to the pusher rod 11.

An anchoring 19 is preferably provided to anchor the pusher rod 11 within the centering tube 12, to prevent rotation or movement of the pusher rod 11 within the centering tube 12 in the course of the deboning operation, and to prevent breaking of the bone 8 or improper deboning. In case rather large animal parts have to be deboned, namely significant forces have to be applied by the pusher rod 10 to allow the bone 8 to be loosened and separated from the meat 9. Thereby it may happen that there is a tendency that the pusher rod 11 is rotated, which may cause breaking of the bone.

The bone pusher assembly 10 of the device of this invention further comprises a guiding 18, for guiding the displacement of the centering tube 12 and pusher rod 11 between the retracted and extended position.

The surface of the head part 13 of the pusher rod 11 facing the animal part 7 preferably has a shape which is adapted to the shape of the end of the bone 8 to be received by it to allow larger forces to be applied to the bone and provide an improved deboning. Thereto, the surface of the head part 13 and the end of the bone may have a complementary shape, so that they engage each other. In another possible embodiment a pin 14 may be mounted on the head part 13, which is provided to engage the cartilage part of the knuckle. The circumferential edge of the pusher rod 11 preferably protrudes in downward direction to engage the knuckle and allow an improved grip on the bone. In that way also there is no necessity that the pin engages the bone exactly in the middle to allow a proper deboning. Preferably the edges are somewhat rounded so prevent that the bone is cleaved. In a further embodiment, the surface of the head part is provided with an elastic coating to prevent damaging of the bone in the course of the deboning operation. The head part 13 may form an integral part of the pusher rod or may be removably mounted.

A driving drives the displacement of the pusher rod 11 and centering tube 12 between the retracted and the extended position. In the embodiment shown in FIGS. 3 and 4, the driving is pneumatic. It is preferred in the present invention that each bone pusher assembly 10 comprises its own driving, so as to allow increased forces to be applied and larger animal parts to be deboned. A preferred pneumatic driving system comprises a cam carrying plate at 37. The cams are provided to operate control valves, which either provide pressure for displacing the bone pusher assembly towards or from the meat stripper disc. Thereto, the pneumatic driving system comprises a plurality of double acting pneumatic pressing cylinders 17.

At a position upstream the deboning position of the processing path preferably cutting means 29 are provided for cutting any meat and/or tendons and/or ligaments remaining between the bone and the meat from the bone. The cutting means 29 are preferably capable of cutting bone to prevent blockage of the system if the bone is not completely pushed through the meat stripper disc 21.

The operation of the device of this invention can be described as follows.

An animal part 7, preferably a fowl part, to be deboned is loaded at the loading position 3 into the deboning unit 1. Thereto, the bone pusher assembly 10 is lifted manually with the animal part. The animal part 7 is loaded in by inserting one side of the bone against the head part 13 of the pusher rod 11. The part carrying the other side of the bone rests on the meat stripper disc 21. In case the bone pusher assembly 10 has been lifted too high, it will sink by itself, because of its own weight. As the housing 5 revolves around its revolving axis 30 towards the deboning position, valve 27 is opened by the cam plate 27, and pressurized air is introduced into the cylinder 17. As the cylinder 17 is filled, bone pusher assembly 10 is lowered in the direction of the work table 15. The top of the pusher rod 11 penetrates the animal part 7 and is moved in downward direction within the animal part, thereby forcing the first knuckle of the bone to pass through the aperture 22. As the bone approaches the meat stripper disc 21, first the small knuckle is forced to pass through the aperture 22. As pressure in cylinder 17 increases, the pusher rod 11 is guided further in downward direction, thus forcing the bone 8 to pass through the aperture 22. Thereby the inner part of the meat stripper disc is bent with respect to its outer edge, and the rim of the aperture 22 scrapes over the bone, to improve the meat removal. After part of the bone has been displaced through the aperture 22, the bone 8 is received in the bone receiver. The pusher rod 11 is extended with respect to the meat stripper disc 21 over a distance which is at least the length of the tendons of the animal part, in such a way that the pusher rod protrudes from the aperture 22. At that time, the animal part is completely deboned. Valve 38 is opened, pressurized gas is introduced at 39 and bone pusher assembly 10 is raised. Any remaining meat and/or tendons and/or ligaments are cut from the bone 8 after the bone pusher assembly 10 has been lifted above the meat stripper disc 21.

What is claimed is:

1. A deboning device for separating bone (8) and meat (9) of an animal part (7), which device comprises a support system (5) for supporting at least one deboning unit (1) and moving said at least one deboning unit (1) from a loading position (3) for loading the animal part (7) to a deboning position (4) for deboning the animal part (7), the deboning unit (1) being provided to receive the animal part (7) in longitudinal direction thereof, the deboning unit (1) comprising a meat stripper device (2) with a meat stripper disc (21) made of a flexible material, the meat stripper disc (21) comprising an aperture (22) for receiving the bone (8) in longitudinal direction there through, the deboning unit (1) also comprising a bone pusher assembly (10), the bone pusher assembly (10) being aligned with the meat stripper disc (21) and being slideably movable in longitudinal direction of the animal part (7) so as to co-operate with the meat stripper disc (21) to displace the bone (8) in longitudinal direction of the meat (9), at least part of the bone pusher assembly (10) being displaceable throughout the aperture (22) in the meat stripper disc (21), characterized in that the deboning device further comprises a) clamping means to allow for a clamping of the animal part (7) within the deboning unit (1) in the longitudinal direction of the bone (8), the clamping means comprising the meat stripper device (2), the meat stripper device being provided to support a lower part of the animal part in cross direction of the bone, and a head part (13, 14) of the bone pusher assembly (10) facing the meat stripper disc (21), so as to clamp the animal part between the head part (13, 14) and the meat stripper device (2), b) space around the animal part being open to allow the meat to be compressed in the course of the deboning operation, and c) means for retaining the bone after it has been displaced through the aperture of the meat stripper disc.

2. A device as claimed in claim 1, characterized in that at least part of the bone pusher assembly (10) is displaceable through the aperture in the meat stripper disc (21) over a distance of between 1 and 1000 mm.

3. A device as claimed in claim 1, characterized in that at least part of the bone pusher assembly (10) is displaceable through the aperture in the meat stripper disc (21) over a distance that is at least the length of the tendons.

4. A device as claimed in claim 1, characterized in that means are provided to adjust the position of the clamping means (2, 10) to the length of the animal part (7).

5. A deboning device as claimed in claim 1, characterized in that the bone pusher assembly (10) comprises a pusher rod (11) that is slideably moveable within the deboning unit for displacing the bone through the meat stripper disc in longitudinal direction of the bone, which pusher rod (11) is displaceable towards a retracted position so as to allow the animal part to be inserted in the deboning unit (1), and an extended position for deboning the animal part (7).

6. A deboning device as claimed in claim 5, characterized in that the pusher rod (11) comprises at a side facing the meat stripper disc, a head part (13) which is shaped to engage a first end of the bone of the animal part.

7. A deboning device as claimed in claim 6, characterized in that the head part (13) has a surface that is coated with a coating of an elastic material.

8. A deboning device as claimed in claim 6, characterized in that the head part (13) is removably mounted to the pusher rod (11).

9. A deboning device as claimed in claim 8, characterized in that the pusher rod (11) is mounted within a central tube (12).

10. A deboning device as claimed in claim 9, characterized in that the central tube (12) and pusher rod (11) are driven by a double acting pneumatic cylinder (17) for moving the bone pusher assembly from the retracted position towards the deboning position and back.

11. A deboning device as claimed in claim 1, characterized in that the meat stripper disc (2) comprises at a side pointing away from the bone pusher assembly (10), a frame (23) for receiving the meat stripper disc (21) and supporting the meat stripper disc (21) along at least part of its circumference, which meat stripper disc (2) further comprises clamping means (24) for removably clamping the meat stripper disc (21) within said frame (23).

12. A deboning device as claimed in claim 11, characterized in that the meat stripper disc (21) and the frame (23) comprise co-operating, complementary projections (25) and recesses (26).

13. A deboning device as claimed in claim 1, characterised in that the meat stripper disc (21) has a thickness, which decreases towards the aperture.

14. A device as claimed in claim 1, characterized in that cutting means (20) are provided at a position upstream of the deboning position for cutting any meat and/or tendons and/or ligaments remaining between the bone and the meat from the bone.

15. A device as claimed in claim 1, characterized in that the deboning units are mounted on a revolving support system (5) and extend parallel to the revolving axis of the support system.

16. A device as claimed in claim 1, characterized in that the aperture (22) in the meat stripper disc (21) is smaller than the smallest diameter of the bone.

17. A device as claimed in claim 1, characterized in that means (30) are provided at a position upstream of the deboning position (4), for picking up the meat from the carrier (1) and transporting the meat towards a meat collector (8).

18. A device as claimed in claim 17, wherein the means for picking up the meat from the carrier and transporting the meat towards the meat collector is a paddle wheel.

* * * * *